E. J. GARDNER.
WATCH GLASS AND BEZEL GAGE.
APPLICATION FILED JULY 1, 1919.

1,330,861.

Patented Feb. 17, 1920.

Witness

Inventor
E. J. Gardner.
By C. A. Snow & Co.
Attorneys

UNITED STATES PATENT OFFICE.

EDMOND J. GARDNER, OF VALLIANT, OKLAHOMA.

WATCH GLASS AND BEZEL GAGE.

1,330,861.   Specification of Letters Patent.   Patented Feb. 17, 1920.

Application filed July 1, 1919. Serial No. 307,952.

*To all whom it may concern:*

Be it known that I, EDMOND J. GARDNER, a citizen of the United States, residing at Valliant, in the county of McCurtain and State of Oklahoma, have invented a new and useful Watch Glass and Bezel Gage, of which the following is a specification.

It is the object of this invention to provide a simple instrument whereby the diameters of watch glasses and bezels may be determined expeditiously, not only as to units of measurement, but, as well, as to fractions of such units.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
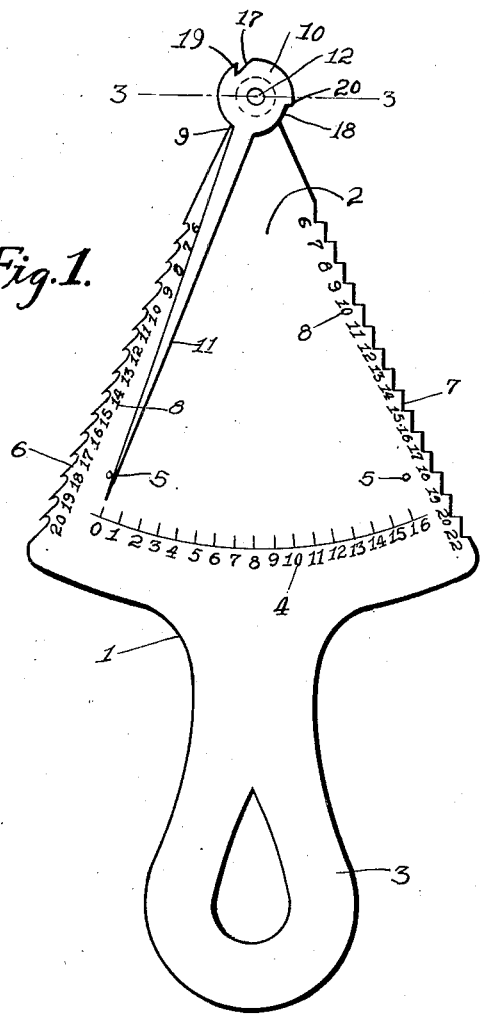
Figure 2:
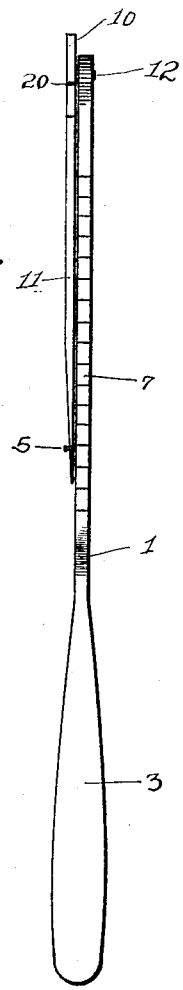
Figure 3:
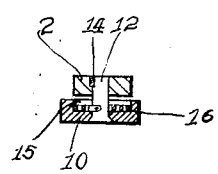

Figure 1 shows in elevation, a device constructed in accordance with the invention; Fig. 2 is an elevation wherein the structure is viewed edgewise; and Fig. 3 is a section on the line 3—3 of Fig. 1.

The device forming the subject matter of this application includes a plate-like body, denoted generally by the numeral 1 and comprising a triangular part 2 and a handle 3, the handle being of any desired sort. An arcuate scale 4 is inscribed on the part 2 of the body 1, the said part being provided with stop pins 5. In one edge of the part 2, seats 6 are fashioned, there being seats 7 in the opposite edge of the part 2, the seats 6 and 7 facing in opposite directions. Characters 8 are inscribed on the part 2, adjacent to the seats 6 and 7.

The invention comprises a pointer, denoted generally by the numeral 9, the pointer including a head 10 and an arm 11, the arm 11 being adapted to move between the stop pins 5 and to coöperate with the scale 4. The head 10 is mounted to swing on a pivot element 12 secured at 14 to the extremity of the part 2 of the body 1. A spring means is provided for holding the arm 11 of the pointer 9 normally against that one of the pins 5 which is next to the zero marking of the scale 4. The spring means above alluded to may be of any desired sort. A recess 15 may be fashioned in the rear side of the head 10 of the pointer 9, and in this recess may be located a spiral spring 16, one end of which is secured to the head, the other end of which is secured to the pivot element 12, the function of the spring being, obviously, to bring the arm 11 of the pointer 9 to the zero mark of the scale 4 as aforesaid. The head 10 projects laterally beyond those edges of the part 2 of the body 1 wherein the seats 6 and 7 are located. In its edge, the head 10 of the pointer 9 is supplied with seats 17 and 18, defining, respectively, projections 19 and 20.

The seats 17 and 18 face in opposite directions, the seat 18 facing toward the seats 7, the seat 17 facing away from the seats 6.

Let it be supposed that it is desired to obtain the outside diameter of a watch glass or a crystal. The edge of the crystal is placed in one of the seats 7, a diametrically opposite portion of the edge of the crystal being engaged in the seat 18 of the pointer and with the projection 20. Obviously, the arm 11 of the pointer will be swung to the right (Fig. 1) the extremity of the arm coöperating with the appropriate one of the graduations of the scale 4. The units may be read from the characters 8 which are adjacent to the seats 7, fractional parts of a unit being read off on the scale 4. In a similar way, a bezel may be hooked into one of the seats 6, the diametrically opposite portion of the bezel being hooked into the seat 7 on the head 10, in engagement with the projection 19. As before, the extremity of the arm 11 of the pointer will be swung to the right (Fig. 1). Full sizes are read off from the characters 8 adjacent to the seats 6, fractions being read off on the scale 4.

While the measuring operation is being carried on, either for the purpose of measuring the outside diameter of a watch crystal or the inside diameter of a bezel, the spring 16 serves to maintain the projection 20 engaged with the watch crystal, or to maintain the projection 19 engaged with a bezel.

The device forming the subject matter of this application is simple in construction and affords an accurate means whereby watch crystals and bezels may be measured, there being no parts in the structure which are likely to become disarranged or need adjustment.

Having thus described the invention, what is claimed is:—

1. In a device of the class described, an approximately triangular body provided at its base with a handle, and having a scale, there being seats in the edges of the body between the apex of the body and the base thereof; a pointer including a head pivoted to the body adjacent to the apex thereof and projecting beyond said edges of the body, the head having seats coöperating with the seats of the body, the pointer including an arm projecting from the head and coöperating with the scale; a stop on the body and coöperating with the arm to limit the movement of said arm in one direction; and means coöperating with the body and with the pointer for holding the arm engaged with the stop.

2. In a device of the class described, a body provided with a scale and supplied in its edges with sets of seats, the seats of one set facing in an opposite direction to the seats of the other set; a pointer coacting with the scale and having projections adjacent to the sets of seats; and means for pivoting the pointer to the body.

3. In a device of the class described, a body provided with a scale and supplied in its edges with sets of seats, the seats of one set facing in an opposite direction to the seats of the other set; a pointer coöperating with the scale and comprising a head projecting beyond said edges of the body, the head being supplied with seats which face in opposite directions with respect to each other, one set of the head coacting with one set of seats in the body, and the other seat of the head coacting with the other set of seats in the body; and means for pivoting the head to the body.

In testimony that I claim the foregoing as my own, I have hereto affixed my signature in the presence of two witnesses.

EDMOND J. GARDNER.

Witnesses:
G. E. WHITE,
J. R. CLARK.